(12) United States Patent
Santangelo et al.

(10) Patent No.: US 11,745,098 B2
(45) Date of Patent: Sep. 5, 2023

(54) REMOTE PLAY USING A LOCAL PROJECTOR

(71) Applicant: Sony Interactive Entertainment LLC, San Mateo, CA (US)

(72) Inventors: Josh Santangelo, San Mateo, CA (US); Ben Rottler, San Mateo, CA (US); Warren Benedetto, Foothill Ranch, CA (US); Jon Webb, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/552,066

(22) Filed: Dec. 15, 2021

(65) Prior Publication Data

US 2023/0182009 A1    Jun. 15, 2023

(51) Int. Cl.
*A63F 13/27*        (2014.01)
*A63F 13/327*       (2014.01)

(52) U.S. Cl.
CPC ............ *A63F 13/27* (2014.09); *A63F 13/327* (2014.09)

(58) Field of Classification Search
None
See application file for complete search history.

(56) References Cited

U.S. PATENT DOCUMENTS

| 8,368,753 | B2 | 2/2013 | Zalewski |
| 2006/0082736 | A1 | 4/2006 | Gruger |
| 2006/0103811 | A1 | 5/2006 | May et al. |
| 2009/0001710 | A1 | 4/2009 | Huebner |
| 2011/0111849 | A1 | 5/2011 | Sprague et al. |
| 2011/0115823 | A1 | 5/2011 | Huebner |
| 2011/0228175 | A1 | 9/2011 | Nicoli et al. |
| 2011/0267316 | A1* | 11/2011 | Kim .................... H04M 1/0285 345/175 |
| 2013/0050206 | A1 | 2/2013 | Willis et al. |
| 2014/0198079 | A1 | 7/2014 | Huebner |
| 2014/0267031 | A1* | 9/2014 | Huebner ............... G06F 3/0346 345/158 |
| 2016/0364011 | A1 | 12/2016 | Bohn |

OTHER PUBLICATIONS

PCT/US2022/050683 PCT Notification of Transmittal of the International Search Report and Written Opinion, dated Feb. 20, 2023.

* cited by examiner

*Primary Examiner* — Reginald A Renwick
(74) *Attorney, Agent, or Firm* — Penilla IP, APC

(57) ABSTRACT

A controller device for interactive gameplay of a video game is provided, including: the controller device being configured to be handheld by a user; at least one motion sensor, said motion sensor generating motion data in response to movement of the controller device when handheld by the user during the interactive gameplay of the video game; a wireless communications device that receives gameplay video over a network from a remotely executing session of the video game; a projector, said projector being integrated with the controller device, said projector configured to project the gameplay video onto a projection surface in a local environment, wherein the projection of the gameplay video is stabilized based on the motion data.

18 Claims, 5 Drawing Sheets

REMOTE PLAY USING A LOCAL PROJECTOR

FIELD OF THE DISCLOSURE

Implementations of the present disclosure relate to methods and systems for remote play using a local projector.

BACKGROUND

Description of the Related Art

Projectors are capable of receiving a video signal and projecting the video onto a surface, affording a potentially large image for viewing that is appealing to viewers, and also enabling usage of existing surfaces as areas for video display. Continuing advances in technology have enabled the continued miniaturization of projectors, including the development of small form factors as evidenced by current state-of-the-art pico-projectors.

Video game technology continues to develop, with advances in computing and networking technology now enabling gameplay of video games that are executed on remotely situated computing devices.

It is in this context that implementations of the disclosure arise.

SUMMARY OF THE DISCLOSURE

Implementations of the disclosure are drawn to methods and systems for remote play using a local projector.

In some implementations, a controller device for interactive gameplay of a video game is provided, including: the controller device being configured to be handheld by a user; at least one motion sensor, said motion sensor generating motion data in response to movement of the controller device when handheld by the user during the interactive gameplay of the video game; a wireless communications device that receives gameplay video over a network from a remotely executing session of the video game; a projector, said projector being integrated with the controller device, said projector configured to project the gameplay video onto a projection surface in a local environment, wherein the projection of the gameplay video is stabilized based on the motion data.

In some implementations, the movement of the controller device is generated from interactive gameplay of the video game, said motion data being provided as input to the remotely executing session of the video game.

In some implementations, the remotely executing session is executed by a cloud gaming service.

In some implementations, the remotely executing session is executed by a remotely located game console.

In some implementations, the gameplay video depicts a view of a virtual environment of the video game.

In some implementations, the stabilization of the gameplay video includes adjusting a direction of the projector towards a location on the projection surface.

In some implementations, the stabilization of the gameplay video includes adjusting a keystone of the projector in response to lateral movements of the controller relative to the projection surface.

In some implementations, the stabilization of the gameplay video includes adjusting a zoom of the projector in response to movements of the controller towards or away from the projection surface.

In some implementations, said at least one motion sensor includes one or more of an accelerometer, a gyroscope, or a magnetometer.

In some implementations, the controller device further includes at least one input device selected from a button, trigger, joystick, or touchpad.

In some implementations, a system for interactive gameplay of a video game is provided, including: a controller device, said controller device being configured to be handheld by a user, said controller device having at least one motion sensor, said motion sensor generating motion data in response to movement of the controller device when handheld by the user during the interactive gameplay of the video game; a projector, said projector configured to be detachably connected to the controller device, said projector having a wireless communications device that receives gameplay video over a network from a remotely executing session of the video game, said projector configured to project the gameplay video onto a projection surface in a local environment, wherein the projection of the gameplay video is stabilized based on the motion data.

In some implementations, the movement of the controller device is generated from interactive gameplay of the video game, said motion data being provided as input to the remotely executing session of the video game.

In some implementations, the remotely executing session is executed by a cloud gaming service.

In some implementations, the remotely executing session is executed by a remotely located game console.

In some implementations, the gameplay video depicts a view of a virtual environment of the video game.

In some implementations, the stabilization of the gameplay video includes adjusting a direction of the projector towards a location on the projection surface.

In some implementations, the stabilization of the gameplay video includes adjusting a keystone of the projector in response to lateral movements of the controller relative to the projection surface.

In some implementations, the stabilization of the gameplay video includes adjusting a zoom of the projector in response to movements of the controller towards or away from the projection surface.

In some implementations, said at least one motion sensor includes one or more of an accelerometer, a gyroscope, or a magnetometer.

In some implementations, the controller device further includes at least one input device selected from a button, trigger, joystick, or touchpad.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

Broadly speaking, embodiments of the present disclosure are drawn to implementations of a projector for enabling gameplay of a video game. In some implementations, the projector is a standalone device capable of enabling remote gameplay of a video game executed by a cloud video game service or by a remote computing device such as a game console or personal computer. In other implementations, the projector is integrated with a controller device operated by the user for gameplay. In related implementations, the projector is configured as an attachment which can be connected to an existing controller device. In such implementations, the image projected by the projector is stabilized using motion data captured by the controller device, so that the position of the image on a given projection surface is maintained in a consistent fashion for ease of viewing by the player.

Figure 1:
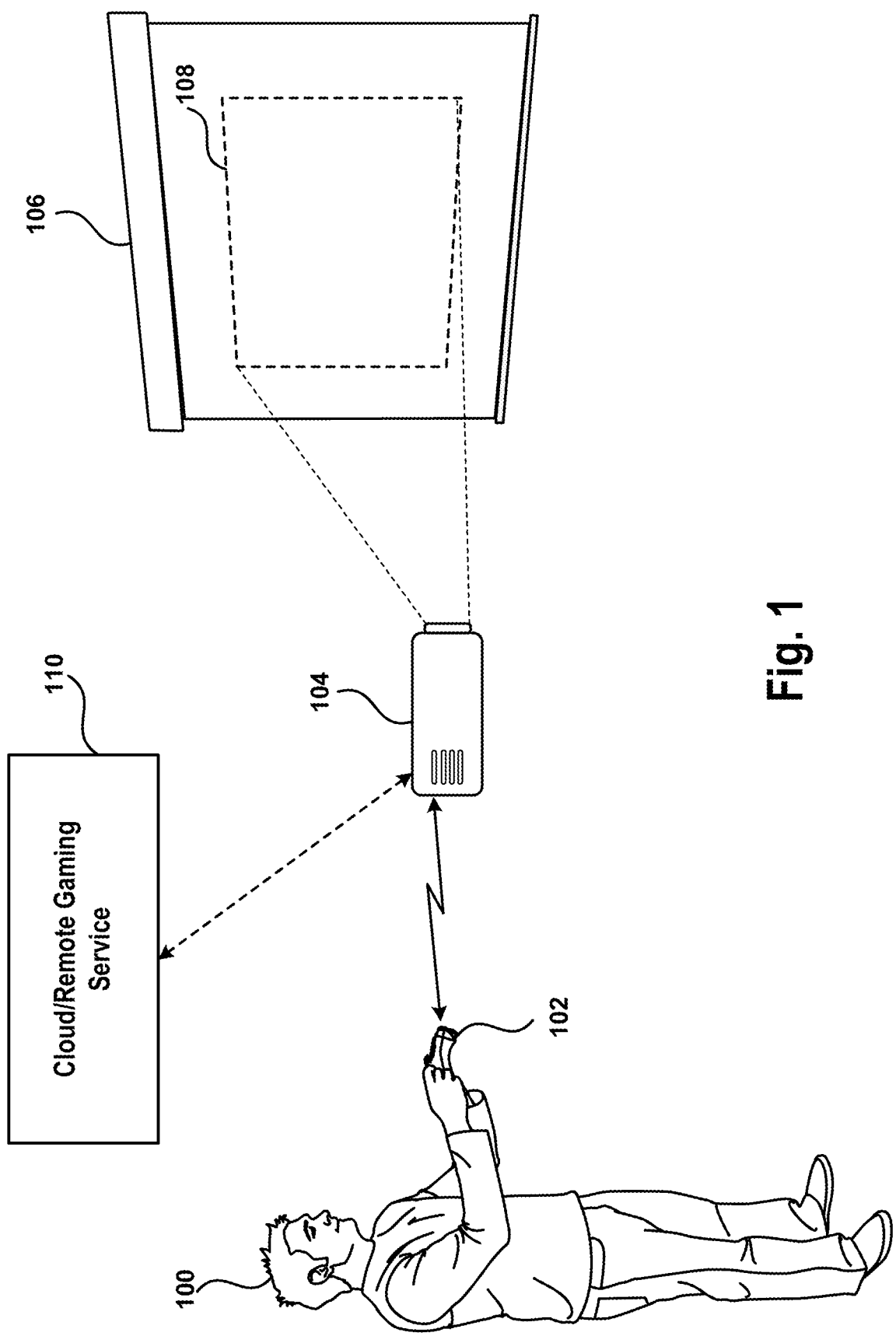
FIG. 1 conceptually illustrates a system for providing remote gameplay via a projector, in accordance with implementations of the disclosure.

FIG. 1 conceptually illustrates a system for providing remote gameplay via a projector, in accordance with implementations of the disclosure. In the illustrated implementation, a user 100 operates a controller 102 for providing input to a video game. The video game is executed at a location/device that is remote from the user's location. For example, in some implementations, the video game is executed in the cloud by a cloud gaming service 110. In such implementations, the video game may be executed by a cloud game machine, a virtualized game machine, or other hardware or server resources capable of executing a session of the video game. In some implementations, the video game is executed by a remote computing device (e.g. game console, computer, gaming machine, etc.), and made available through a remote gaming service. The remote gaming service facilitates remote gameplay of the video game, such as by facilitating transmission of video from the remote computing device and transmission of input to the remote computing device.

A projector 104 is configured to receive video from the video game, such as from the cloud/remote gaming service 110, and display/project the video onto a surface 106, conceptually shown as the projected video 108 in the illustrated implementation. By way of example without limitation, the surface 106 can be a wall, ceiling, projection screen, or other surface suitable for projection of images thereon. In some implementations, the controller 102 communicates with the projector 104 via a wired or wireless connection, and input from the controller 102 is transmitted from the controller 102 to the projector 104, which passes the input to the executing video game to be processed to drive the execution of the game.

It will be appreciated that in some implementations, the projector 104 can have a portable form factor to enable ease of transport. Furthermore, the projector 104 includes all necessary componentry to enable projection of images onto a surface, such as electronics for receiving and processing video signals, a light source, and optics. In some implementations, the projector 104 includes a battery to enable use without plugging into an outlet. In some implementations, the projector 104 includes wireless communications electronics, to enable wireless communication over various network/wireless protocols, such as 5G cellular, WiFi, and Bluetooth.

It will be appreciated that the projector 104 as described enables remote play of video games by a user. For example, the user may be away from home where the user's game console is located, and the projector 104 can be used to enable the user to remotely play a video game that is executed on the user's game console at home. That is, the video game can be remotely executed on the user's game console, and the video can be transmitted over one or more networks to the projector 104 for display onto a surface in the user's local environment. The transmission of the video can be enabled through a remote gaming service in some implementations. In other implementations, the video game is executed by a cloud gaming service as previously described. The projector 104 constitutes a portable device that allows the user to enjoy gameplay of video games in any location with suitable connectivity and a suitable projection surface for viewing.

In some implementations, the projector 104 is configured to project anchor images on the projection surface, which are used for controller tracking. That is, the controller's 102 location/orientation in the local environment can be determined, at least in part, based on captured images by a camera included in the controller, by identifying and tracking at least some of the projected anchor images in the captured images.

In some implementations, the projector 104 includes a video pass-through connector, such as an HDMI input, DVI input, or other video input, through which video from another source or device can be received by the projector 104 and projected onto the projection surface.

In some implementations, a projector is attached to or integrated with a controller device that provides input to a video game. The projector projects the view of the game, and the projected image of the projector can be stabilized using motion data from the controller.

Figure 2A:
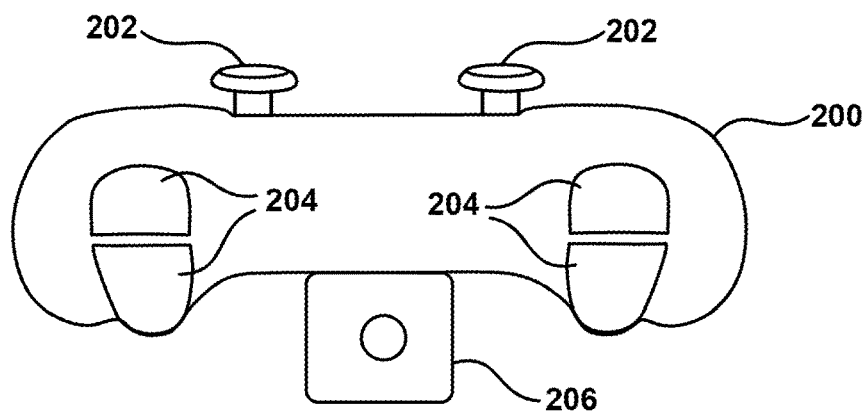
FIG. 2A illustrates a front view of a controller having an attached projector, in accordance with implementations of the disclosure.

FIG. 2A illustrates a front view of a controller having an attached projector, in accordance with implementations of the disclosure. In the illustrated implementation, the projector 206 is attached to the underside of the controller 200. The controller 200 includes various input devices, such as joysticks 202 and triggers/buttons 204. The configuration of the projector 206 attaching to the underside of the controller 200 leaves the top surface of the controller 200 exposed for easy access to any input devices positioned on the top surface, such as the joysticks 202 as well as others, such as buttons or a touchpad. It will be appreciated that projector 206 is configured to be detachably connected to the controller 200, and communicates with the controller 200. As described herein, the projector 206 receives motion data from the controller 200 to enable stabilization of the projected image.

Figure 2B:
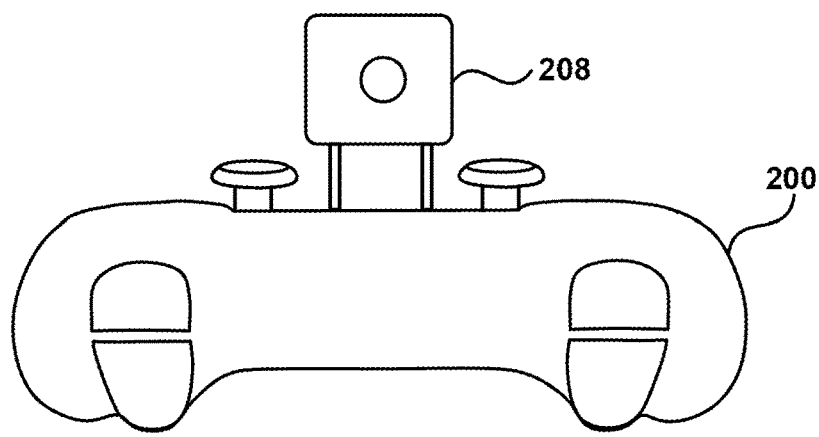
FIG. 2B illustrates a front view of a controller having an attached projector, in accordance with implementations of the disclosure.

FIG. 2B illustrates a front view of a controller having an attached projector, in accordance with implementations of the disclosure. In the illustrated implementation, the projector 208 is attached to the top side of the controller 200. The attachment configuration of the projector 208 is such that the projector 208 is raised and supported above the top surface of the controller 200, so that input devices on the top surface of the controller are still accessible. It will be appreciated that projector 208 is configured to be detachably connected to the controller 200, and communicates with the controller 200, and further receives motion data from the controller 200 to enable stabilization of the projected image.

Figure 2C:
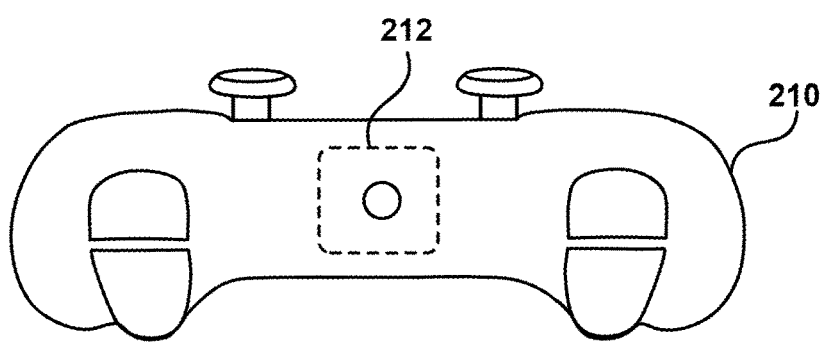
FIG. 2C illustrates a front view of a controller having an integrated projector, in accordance with implementations of the disclosure.

FIG. 2C illustrates a front view of a controller having an integrated projector, in accordance with implementations of the disclosure. In the illustrated implementation, the controller 210 includes a projector 212. The image from the projector is stabilized as described herein.

Figure 3:
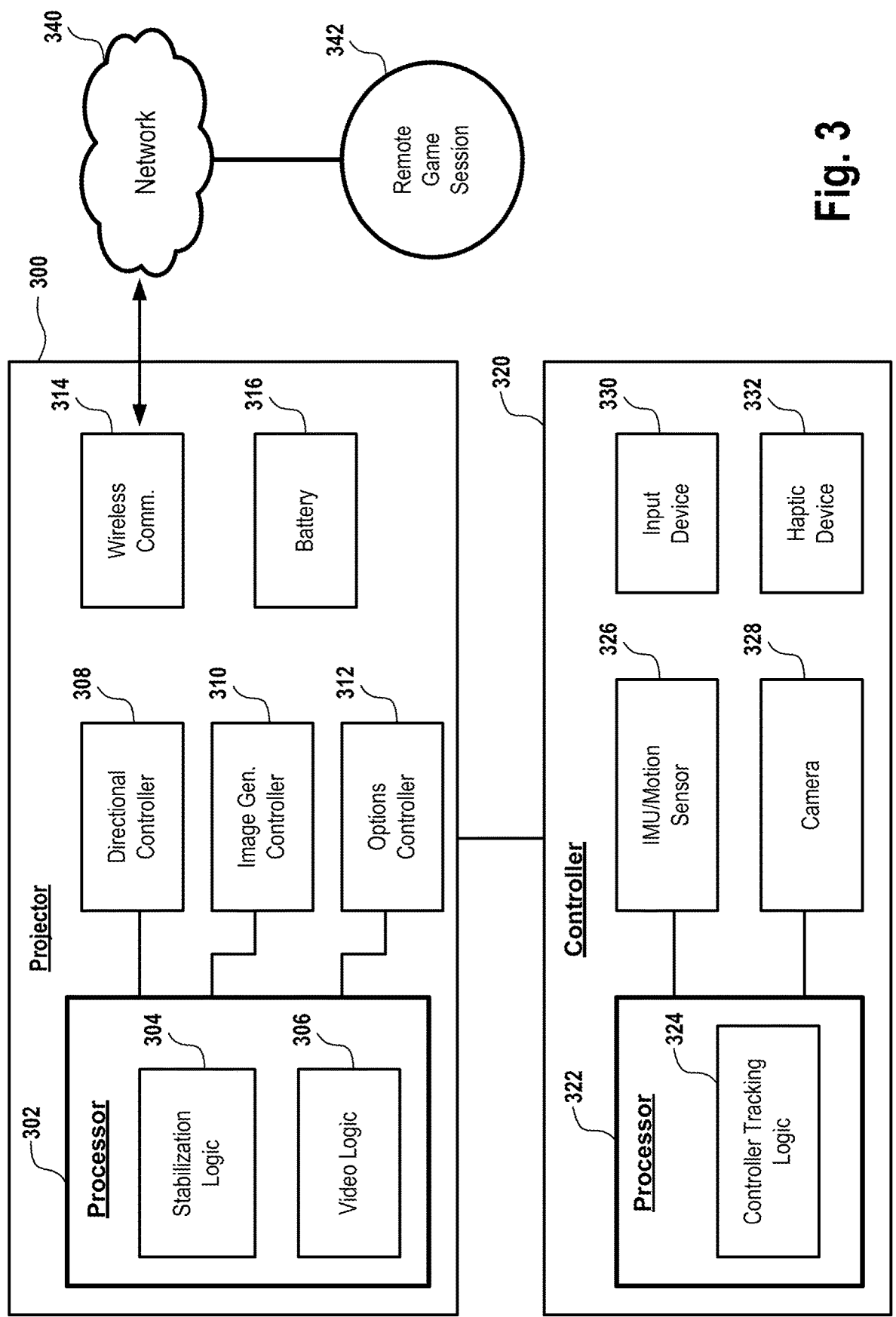
FIG. 3 conceptually illustrates a system for enabling remote gameplay using a projector attached to or integrated with a controller, in accordance with implementations of the disclosure.

FIG. 3 conceptually illustrates a system for enabling remote gameplay using a projector attached to or integrated with a controller, in accordance with implementations of the disclosure. In the illustrated implementation, a projector 300 is communicably connected to a controller 320. The projector 300 can be detachably connected to the controller through an attachment mechanism, or in other implementations can be integrated with the controller 320.

The controller 320 includes one or more input devices 330, such as joysticks, buttons, directional pads, touch pads, biometric sensors, etc. for generating input for a video game. The controller 320 further includes one or more motion sensors 326 for detecting the location, orientation, and movement of the controller 320. In some implementations, the motion sensors 326 can include one or more accelerometers, magnetometers, and gyroscopes. In some implementations, motion sensor 326 is defined in the form of an inertial measurement unit (IMU). In some implementations, the controller 326 includes one or more cameras 328, which can be used for tracking, such as by employing a simultaneous location and mapping (SLAM) technique.

The controller 326 includes at least one processor 322 configured to execute controller tracking logic 324, which determines and tracks the location/position and orientation of the controller, and the movements of the controller, based on motion data from the aforementioned motion sensors 326 and/or image data from the camera 328. In some implementations, the controller 320 further includes one or more haptic devices 332, which can be activated to provide haptic feedback to the user, such by generating vibrations or other haptic sensations by the controller.

The projector 300 is connected to or integrated with the controller 320. The projector includes a battery 316 for powering its componentry. Projector 300 includes a wireless communications module 314 that enables wireless communication (e.g. WiFi, 5G, etc.) via network 340 with a remote game session 342 of a video game. As described above, in some implementations, remote game session 342 is executed by a cloud gaming service, and in some implementations, remote game sessions 342 is executed by a user's remote gaming device such as a game console or computer. Video from the remote game session is streamed over the network 340 to the projector 300 for display.

The projector includes a processor 302 that executes video logic 306 for handling and processing the incoming video for projection. Processor 302 further executes stabilization logic 304, which is configured to stabilize the projected image of the projector 300 based on the motion data of the controller 320, so as to maintain the projected image in a substantially stationary configuration (e.g. stationary location, orientation, magnification, keystone, brightness/color consistency, etc.). In some implementations, stabilization logic 304 communicates to a directional controller 308 to control and adjust the direction/tilt of projection (e.g. pitch, yaw, roll) so as to stabilize the projected image. In some implementations, stabilization logic 304 communicates to an optics controller 312 to control and adjust optical properties of the projector, such as the zoom (size) and keystone, so as to stabilize the projected image. In some implementations, stabilization logic 304 communicates to an image generation controller 310 to adjust the projected image generation to stabilize the projected image, such as by adjusting brightness, color intensity, or other image properties for various regions of the projection so as to stabilize the image.

It will be appreciated that the motion data and/or the image data from the controller 320 can be used as input for the remote game session 342 of the video game. In such implementations, the motion/image data can be communicated via the projector over the network 340 to the remote game session 342, or by the controller itself over the network to the remote game session. In such implementations, motion data of the controller 320 serves two purposes, both as input for the game, and as data for enabling stabilization of the projector's 300 projected video image.

In some implementations, the image data from the camera 328 is processed and used as feedback for the system, to determine and verify whether the projected video is being properly stabilized. For example, the image data can be analyzed to identify the projected video on the projection surface, and identify other anchors in the local environment, and determine whether the projected video is being maintained in a stable position on the projection surface.

In some implementations, the motion sensors 326 and/or the camera 328 are included in the projector 300, and data therefrom is processed at the projector by the stabilization logic 304.

In some implementations, the projector 300 receives from the controller 320 the motion data and/or image data generated by the motion sensors 326 and camera 328, respectively. In some implementations, the projector 300 receives such data after it is first processed at the controller by the controller tracking logic. In some implementations, the projector 300 receives movement information processed from the motion/image data that indicates the movement detected based on the motion/image data.

In some implementations, the remote game session 342 is configured to optimize rendering of the gameplay video based on the detected location/orientation and/or movement of the controller or projector. For example, the remote game session 342 may adjust the brightness or color intensity or other graphical property of regions of the video based on such information. This may compensate for movement of the projector by enhancing the stability of the image quality of the projected video.

In some implementations, in response to an abrupt change in the direction of the projector/controller, the virtual view direction is temporarily changed in a similar direction (in the virtual environment of the video game), thereby rendering an extension of the view in the direction that the projector has moved. Then as the projector is stabilized back towards its original direction, so also the virtual view direction returns to its original direction in the virtual environment.

Thus, in view of the above, a hybrid projector stabilization technique is provided, wherein stabilization is performed both by the projector 300 and by the remote game session 342.

Figure 4:
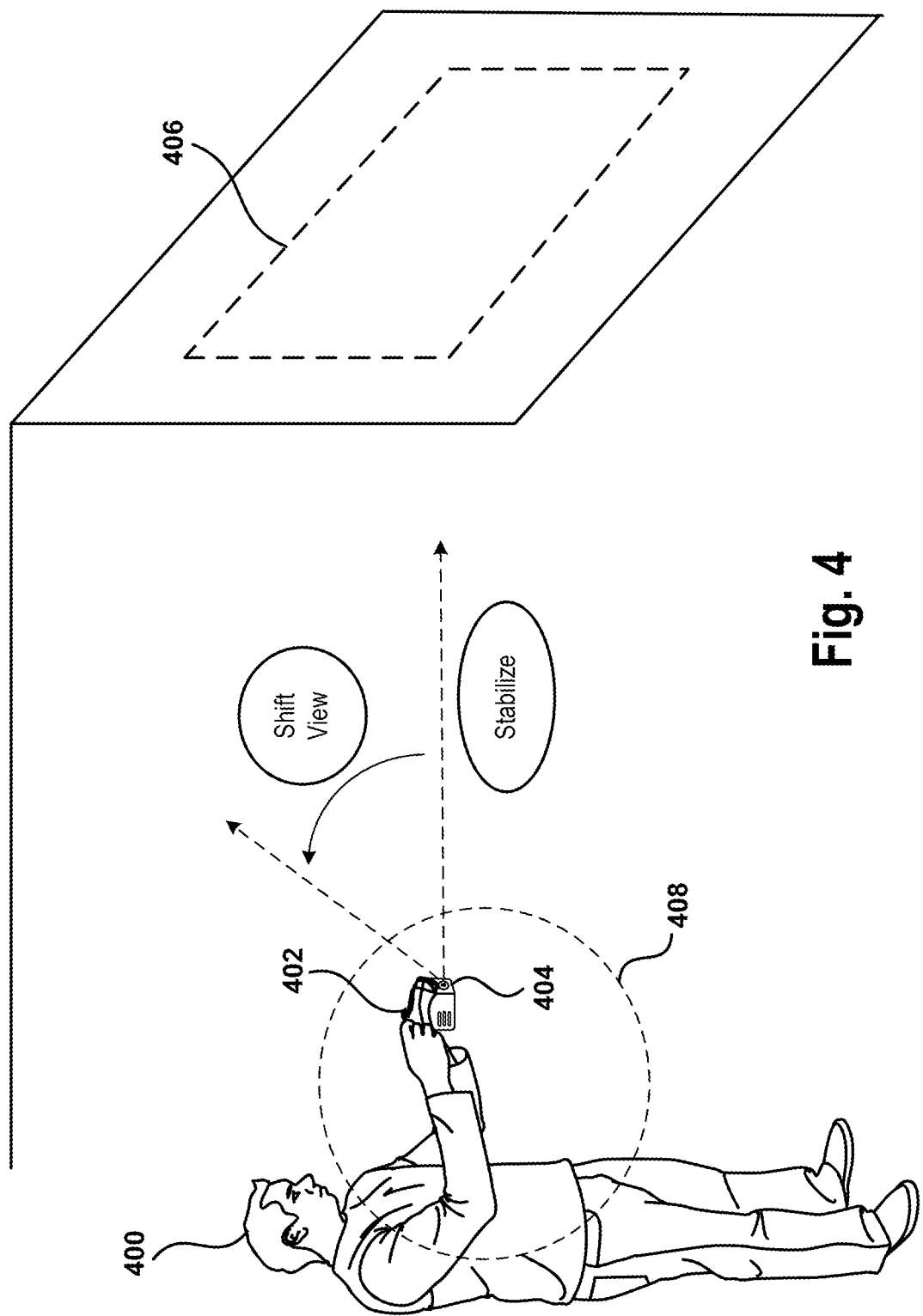
FIG. 4 conceptually illustrates a user operating a controller having a projector attached or integrated therewith, in accordance with implementations of the disclosure.

FIG. 4 conceptually illustrates a user operating a controller having a projector attached or integrated therewith, in accordance with implementations of the disclosure. In the illustrated implementation, the user 400 operates a controller 402 having a projector 404 attached or integrated therein. As described above, the projected video 406 of a video game is stabilized to enhance the user's viewing experience during gameplay.

In some implementations, a zone 408 is defined in the local environment, which delineates the approximate limits of the capability of the controller/projector combination device to stabilize the projected video 406. For example, if the controller (and projector) is moved too far up/down/left/right/forward/backward then the projected video is no longer capable of being stabilized in the same location on the projection surface, such as by keystone adjustments and/or zoom adjustments. Thus, in some implementations, the zone 408 defines a region of the local environment, such that when the controller reaches the border/edge of the zone 408, then feedback to provided to the user to warn the user that continued movement of the controller beyond the zone 408 may result in the projected video no longer being stabilized in the same location. In some implementations, the feedback is in the form of a pop-up display shown in the projected video. In some implementations, the feedback is in the form of an audio warning/sound. In some implementations, the feedback is in the form of haptic feedback provided through the controller 402.

Similarly, if the controller direction/tilt (pitch/yaw/roll) is rotated beyond a certain amount, for example, off of given centered axes, then the projected video may no longer be able to be stabilized at that location. Thus, in some implementations, maximum rotation amounts off axis can be defined, and feedback similar to that described above can be provided to the user if such maximums are reached.

In some implementations, rather than stabilizing the projected video so as to maintain the video at a stationary location, the direction of the controller is used to control the direction of the virtual view. Thus, as the controller is moved and/or rotated, then the physical location of the projected video also moves, so as to reveal different portions of the virtual environment as the corresponding virtual view direction moves in a similar fashion. The effect is akin to moving/directing a virtual camera by moving/directing the controller, so that where the virtual camera is moved (in accordance with the movement of the controller) then that region of the virtual environment captured by the virtual camera is rendered and projected for viewing by the user. In such implementations, the projected video image is functioning as a moveable window into the virtual environment. In some implementations, this mode of projector operation can be characterized as a moveable virtual viewing mode, as opposed to the previously described stationary viewing mode. In some implementations, during the moveable virtual viewing mode, the previously described stabilization is not performed. However, without any stabilization of the projector, this may lead to unwanted jitteriness of the projected video due to user hand shake or a general lack of smoothness in the video viewing experience as even small movements of the projector can cause large movements of the projected video at distance.

Therefore, in some implementations, during the moveable virtual viewing mode, the projector is stabilized in a manner so as to counteract user hand shake and smooth out abrupt projector movements. It will be appreciated that in such implementations, the movements of the controller are used for both stabilization and also for virtual camera control. This enables the user to comfortably view the projected video, even while also being able to direct the virtual camera so as to view different portions of the virtual environment.

In some implementations, the moveable virtual viewing mode and the stationary viewing mode are enabled at different times. In some implementations, the user may toggle between the two modes using an input mechanism such as a button press or trigger activation. In some implementations, the stationary viewing mode is active by default, and the system switches to the moveable virtual viewing mode in response to a continuously applied input, such as by holding down a button or trigger, then returns to the stabilized viewing mode when the input ceases to be applied, such as releasing the button or trigger.

In some implementations, the stationary viewing mode is active when the controller is substantially oriented in a first orientation (such as being pointed towards the front wall), but the system switches to the moveable virtual viewing mode when the controller is substantially oriented in a second orientation (such as being pointed towards the ceiling). In some implementations, the switch to the moveable virtual viewing mode occurs in response to a change in the orientation or location of the controller beyond a predefined threshold amount.

While implementations of the present disclosure have been described with reference to a video game, it will be appreciated that in other implementations the principles of the present disclosure can be applied with other types of interactive applications for which video can be projected in accordance with that described above.

In some implementations, the projected video is configured to take into account the three-dimensional geometry of the projection surface. For example, if the projection surface is not a flat surface, then the projected video can be pre-distorted so that when projected onto the projection surface, the video appears undistorted to the user.

Figure 5:
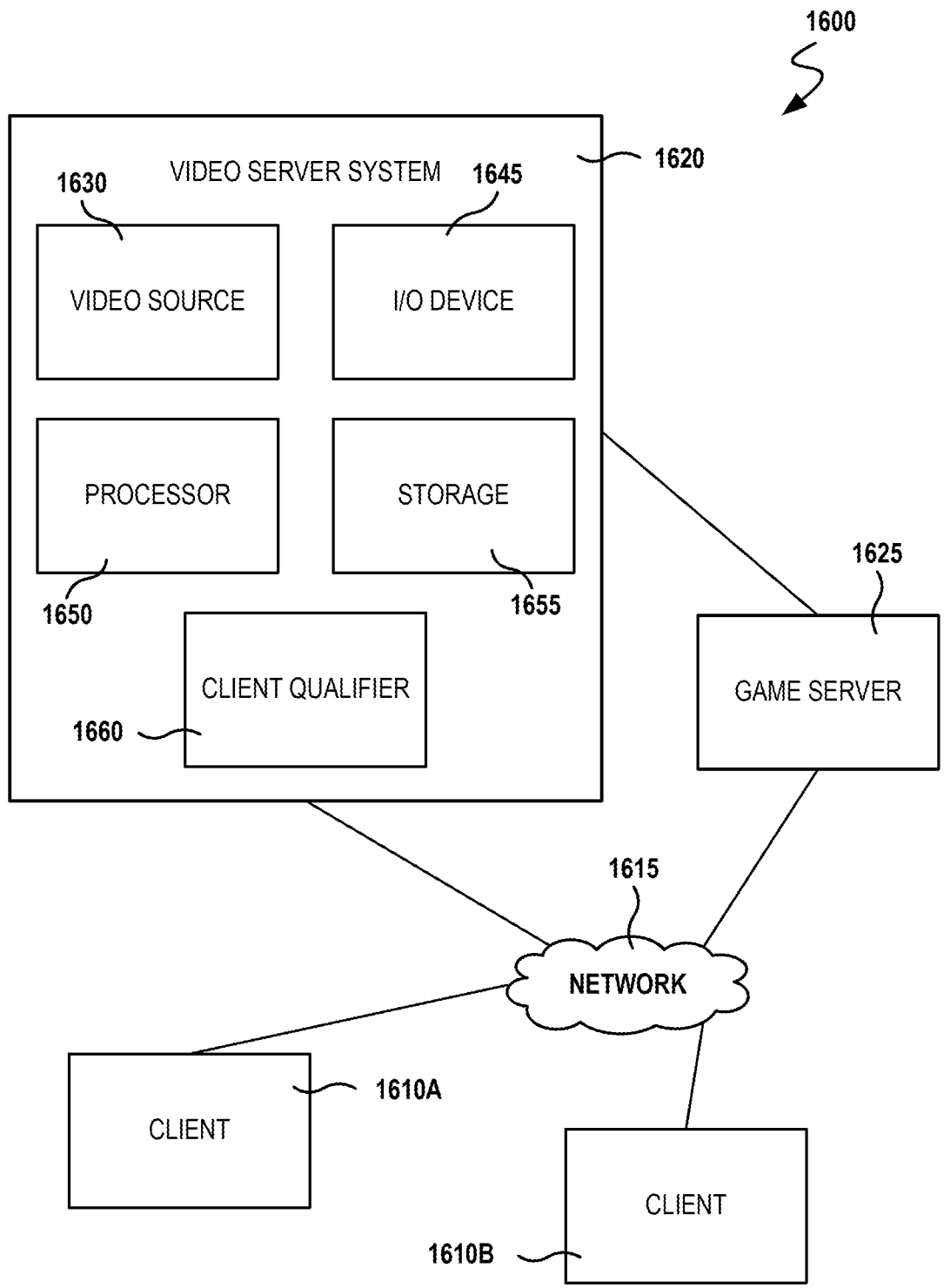
FIG. 5 is a block diagram of a Game System, according to various implementations of the disclosure.

FIG. 5 is a block diagram of a Game System 1600, according to various implementations of the disclosure. Game System 1600 is configured to provide a video stream to one or more Clients 1610 via a Network 1615. Game System 1600 typically includes a Video Server System 1620 and an optional game server 1625. Video Server System 1620 is configured to provide the video stream to the one or more Clients 1610 with a minimal quality of service. For example, Video Server System 1620 may receive a game command that changes the state of or a point of view within a video game, and provide Clients 1610 with an updated video stream reflecting this change in state with minimal lag time. The Video Server System 1620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1610, referred to herein individually as 1610A, 1610B, etc., may include HMDs, terminals, personal computers, game consoles, tablet computers, telephones, set top boxes, kiosks, wireless devices, digital pads, stand-alone devices, handheld game playing devices, projectors, and/or the like. Typically, Clients 1610 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1610 or on a separate device such as a monitor or television. Clients 1610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1610 are optionally geographically dispersed. The number of clients included in Game System 1600 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD/MR headset may cooperate with the video server system 1620 to deliver a game viewed through the HMD/MR headset. In one implementation, the game console receives the video stream from the video server system 1620, and the game console forwards the video stream, or updates to the video stream, to the HMD for rendering.

Clients 1610 are configured to receive video streams via Network 1615. Network 1615 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1610 may, but are not required to, further include systems configured for modifying received video. For example, a Client may be configured to perform further rendering, to overlay one video image on another video image, to crop a video image, and/or the like. For example, Clients 1610 may be configured to receive various types of video frames, such as I-frames, P-frames and B-frames, and to process these frames into images for display to a user. In some implementations, a member of Clients 1610 is configured to perform further rendering, shading, conversion to 3-D, or like operations on the video stream. A member of Clients 1610 is optionally configured to receive more than one audio or video stream. Input devices of Clients 1610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1610 is generated and provided by Video Server System 1620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1610 are typically configured to receive inputs from a user. These inputs may include game commands configured to change the state of the video game or otherwise affect game play. The game commands can be received using input devices and/or may be automatically generated by computing instructions executing on Clients 1610. The received game commands are communicated from Clients 1610 via Network 1615 to Video Server System 1620 and/or Game Server 1625. For example, in some implementations, the game commands are communicated to Game Server 1625 via Video Server System 1620. In some implementations, separate copies of the game commands are communicated from Clients 1610 to Game Server 1625 and Video Server System 1620. The communication of game commands is optionally dependent on the identity of the command. Game commands are optionally communicated from Client 1610A through a different route or communication channel than that used to provide audio or video streams to Client 1610A.

Game Server 1625 is optionally operated by a different entity than Video Server System 1620. For example, Game Server 1625 may be operated by the publisher of a multi-player game. In this example, Video Server System 1620 is optionally viewed as a client by Game Server 1625 and optionally configured to appear from the point of view of Game Server 1625 to be a prior art client executing a prior art game engine. Communication between Video Server System 1620 and Game Server 1625 optionally occurs via Network 1615. As such, Game Server 1625 can be a prior art multiplayer game server that sends game state information to multiple clients, one of which is game server system 1620. Video Server System 1620 may be configured to communicate with multiple instances of Game Server 1625 at the same time. For example, Video Server System 1620 can be configured to provide a plurality of different video games to different users. Each of these different video games may be supported by a different Game Server 1625 and/or published by different entities. In some implementations, several geographically distributed instances of Video Server System 1620 are configured to provide game video to a plurality of different users. Each of these instances of Video Server System 1620 may be in communication with the same instance of Game Server 1625. Communication between Video Server System 1620 and one or more Game Server 1625 optionally occurs via a dedicated communication channel. For example, Video Server System 1620 may be connected to Game Server 1625 via a high bandwidth channel that is dedicated to communication between these two systems.

Video Server System 1620 comprises at least a Video Source 1630, an I/O Device 1645, a Processor 1650, and non-transitory Storage 1655. Video Server System 1620 may include one computing device or be distributed among a plurality of computing devices. These computing devices are optionally connected via a communications system such as a local area network.

Video Source 1630 is configured to provide a video stream, e.g., streaming video or a series of video frames that form a moving picture. In some implementations, Video Source 1630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1625. Game Server 1625 may maintain a copy of the state of the game based on game commands received from multiple players using geographically disperse clients. In these cases, the game state is provided by Game Server 1625 to Video Source 1630, wherein a copy of the game state is stored and rendering is performed. Game Server 1625 may receive game commands directly from Clients 1610 via Network 1615, and/or may receive game commands via Video Server System 1620.

Video Source 1630 typically includes rendering logic, e.g., hardware, firmware, and/or software stored on a computer readable medium such as Storage 1655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1610. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1630 includes a video recording device such as a camera. This camera may be used to generate delayed or live video that can be included in the video stream of a computer game. The resulting video stream optionally includes both rendered images and images recorded using a still or video camera. Video Source 1630 may also include storage devices configured to store previously recorded video to be included in a video stream. Video Source 1630 may also include motion or positioning sensing devices configured to detect motion or position of an object, e.g., person, and logic configured to determine a game state or produce video-based on the detected motion and/or position.

Video Source 1630 is optionally configured to provide overlays configured to be placed on other video. For example, these overlays may include a command interface, log in instructions, messages to a game player, images of other game players, video feeds of other game players (e.g., webcam video). In implementations of Client 1610A including a touch screen interface or a gaze detection interface, the overlay may include a virtual keyboard, joystick, touch pad, and/or the like. In one example of an overlay a player's voice is overlaid on an audio stream. Video Source 1630 optionally further includes one or more audio sources.

In implementations wherein Video Server System 1620 is configured to maintain the game state based on input from more than one player, each player may have a different point of view comprising a position and direction of view. Video Source 1630 is optionally configured to provide a separate video stream for each player based on their point of view. Further, Video Source 1630 may be configured to provide a different frame size, frame data size, and/or encoding to each of Client 1610. Video Source 1630 is optionally configured to provide 3-D video.

I/O Device 1645 is configured for Video Server System 1620 to send and/or receive information such as video, commands, requests for information, a game state, gaze information, device motion, device location, user motion, client identities, player identities, game commands, security information, audio, and/or the like. I/O Device 1645 typically includes communication hardware such as a network card or modem. I/O Device 1645 is configured to communicate with Game Server 1625, Network 1615, and/or Clients 1610.

Processor 1650 is configured to execute logic, e.g. software, included within the various components of Video Server System 1620 discussed herein. For example, Processor 1650 may be programmed with software instructions in order to perform the functions of Video Source 1630, Game Server 1625, and/or a Client Qualifier 1660. Video Server System 1620 optionally includes more than one instance of Processor 1650. Processor 1650 may also be programmed with software instructions in order to execute commands received by Video Server System 1620, or to coordinate the operation of the various elements of Game System 1600 discussed herein. Processor 1650 may include one or more hardware device. Processor 1650 is an electronic processor.

Storage 1655 includes non-transitory analog and/or digital storage devices. For example, Storage 1655 may include an analog storage device configured to store video frames. Storage 1655 may include a computer readable digital storage, e.g. a hard drive, an optical drive, or solid state storage. Storage 1615 is configured (e.g. by way of an appropriate data structure or file system) to store video frames, artificial frames, a video stream including both video frames and artificial frames, audio frame, an audio stream, and/or the like. Storage 1655 is optionally distributed among a plurality of devices. In some implementations, Storage 1655 is configured to store the software components of Video Source 1630 discussed elsewhere herein. These components may be stored in a format ready to be provisioned when needed.

Video Server System 1620 optionally further comprises Client Qualifier 1660. Client Qualifier 1660 is configured for remotely determining the capabilities of a client, such as Clients 1610A or 1610B. These capabilities can include both the capabilities of Client 1610A itself as well as the capabilities of one or more communication channels between Client 1610A and Video Server System 1620. For example, Client Qualifier 1660 may be configured to test a communication channel through Network 1615.

Client Qualifier 1660 can determine (e.g., discover) the capabilities of Client 1610A manually or automatically. Manual determination includes communicating with a user of Client 1610A and asking the user to provide capabilities. For example, in some implementations, Client Qualifier 1660 is configured to display images, text, and/or the like within a browser of Client 1610A. In one implementation, Client 1610A is an HMD/MR headset that includes a browser. In another implementation, client 1610A is a game console having a browser, which may be displayed on the HMD/MR headset. The displayed objects request that the user enter information such as operating system, processor, video decoder type, type of network connection, display resolution, etc. of Client 1610A. The information entered by the user is communicated back to Client Qualifier 1660.

Automatic determination may occur, for example, by execution of an agent on Client 1610A and/or by sending test video to Client 1610A. The agent may comprise computing instructions, such as java script, embedded in a web page or installed as an add-on. The agent is optionally provided by Client Qualifier 1660. In various implementations, the agent can find out processing power of Client 1610A, decoding and display capabilities of Client 1610A, lag time reliability and bandwidth of communication channels between Client 1610A and Video Server System 1620, a display type of Client 1610A, firewalls present on Client 1610A, hardware of Client 1610A, software executing on Client 1610A, registry entries within Client 1610A, and/or the like.

Client Qualifier 1660 includes hardware, firmware, and/or software stored on a computer readable medium. Client Qualifier 1660 is optionally disposed on a computing device separate from one or more other elements of Video Server System 1620. For example, in some implementations, Client Qualifier 1660 is configured to determine the characteristics of communication channels between Clients 1610 and more than one instance of Video Server System 1620. In these implementations the information discovered by Client Qualifier can be used to determine which instance of Video Server System 1620 is best suited for delivery of streaming video to one of Clients 1610.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, optical media, non-optical data storage devices, etc. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A controller device for interactive gameplay of a video game, comprising:
    the controller device being configured to be handheld by a user;
    at least one motion sensor, said motion sensor generating motion data in response to movement of the controller device when handheld by the user during the interactive gameplay of the video game;
    a wireless communications device that receives gameplay video over a network from a remotely executing session of the video game;
    a projector, said projector being integrated with the controller device, said projector configured to project the gameplay video onto a projection surface in a local environment, wherein the projection of the gameplay video is stabilized based on the motion data, wherein the stabilization of the gameplay video includes adjusting a zoom of the projector in response to movements of the controller towards or away from the projection surface.

2. The controller device of claim 1, wherein the movement of the controller device is generated from interactive gameplay of the video game, said motion data being provided as input to the remotely executing session of the video game.

3. The controller device of claim 1, wherein the remotely executing session is executed by a cloud gaming service.

4. The controller device of claim 1, wherein the remotely executing session is executed by a remotely located game console.

5. The controller device of claim 1, wherein the gameplay video depicts a view of a virtual environment of the video game.

6. The controller device of claim 1, wherein the stabilization of the gameplay video includes adjusting a direction of the projector towards a location on the projection surface.

7. The controller device of claim 1, wherein the stabilization of the gameplay video includes adjusting a keystone of the projector in response to lateral movements of the controller relative to the projection surface.

8. The controller device of claim 1, wherein said at least one motion sensor includes one or more of an accelerometer, a gyroscope, or a magnetometer.

9. The controller device of claim 1, further comprising:
    at least one input device selected from a button, trigger, joystick, or touchpad.

10. A system for interactive gameplay of a video game, comprising:
- a controller device, said controller device being configured to be handheld by a user, said controller device having at least one motion sensor, said motion sensor generating motion data in response to movement of the controller device when handheld by the user during the interactive gameplay of the video game;
- a projector, said projector configured to be detachably connected to the controller device, said projector having a wireless communications device that receives gameplay video over a network from a remotely executing session of the video game, said projector configured to project the gameplay video onto a projection surface in a local environment, wherein the projection of the gameplay video is stabilized based on the motion data, wherein the stabilization of the gameplay video includes adjusting a zoom of the projector in response to movements of the controller towards or away from the projection surface.

11. The system of claim 10, wherein the movement of the controller device is generated from interactive gameplay of the video game, said motion data being provided as input to the remotely executing session of the video game.

12. The system of claim 10, wherein the remotely executing session is executed by a cloud gaming service.

13. The system of claim 10, wherein the remotely executing session is executed by a remotely located game console.

14. The system of claim 10, wherein the gameplay video depicts a view of a virtual environment of the video game.

15. The system of claim 10, wherein the stabilization of the gameplay video includes adjusting a direction of the projector towards a location on the projection surface.

16. The system of claim 10, wherein the stabilization of the gameplay video includes adjusting a keystone of the projector in response to lateral movements of the controller relative to the projection surface.

17. The system of claim 10, wherein said at least one motion sensor includes one or more of an accelerometer, a gyroscope, or a magnetometer.

18. The system of claim 10, wherein the controller device further includes at least one input device selected from a button, trigger, joystick, or touchpad.

* * * * *